United States Patent
Yildiz et al.

(10) Patent No.: US 8,713,213 B1
(45) Date of Patent: Apr. 29, 2014

(54) FAST PORT SWITCHING IN AN AUDIOVISUAL RECEIVER BY USE OF PORT PRE-AUTHENTICATION BY A PARTIAL PHY DECODER CORE

(75) Inventors: Cenk Yildiz, Mountain View, CA (US); Albert Kuo, Los Gatos, CA (US); Andrew Popplewell, Manchester (GB)

(73) Assignee: CSR Technology, Inc., Sunnyvale, CA (US)

( * ) Notice: Subject to any disclaimer, the term of this patent is extended or adjusted under 35 U.S.C. 154(b) by 445 days.

(21) Appl. No.: 13/074,248

(22) Filed: Mar. 29, 2011

Related U.S. Application Data (60) Provisional application No. 61/320,603, filed on Apr. 2, 2010.

(51) Int. Cl.
 *G06F 3/00* (2006.01)
 *G06F 13/00* (2006.01)

(52) U.S. Cl.
 USPC ............. 710/17; 710/2; 710/5; 710/8; 710/15

(58) Field of Classification Search
 None
 See application file for complete search history.

(56) References Cited

U.S. PATENT DOCUMENTS

| | | | |
|---|---|---|---|
| 7,412,063 B2 | 8/2008 | Lyle | |
| 2009/0144805 A1 | 6/2009 | Araki | |
| 2009/0178097 A1* | 7/2009 | Kim et al. | 725/114 |
| 2009/0190033 A1 | 7/2009 | Asada et al. | |
| 2009/0222905 A1 | 9/2009 | Choi et al. | |
| 2009/0290646 A1* | 11/2009 | Gong et al. | 375/240.25 |
| 2010/0250988 A1* | 9/2010 | Okuda et al. | 713/323 |

* cited by examiner

*Primary Examiner* — Scott Sun
(74) *Attorney, Agent, or Firm* — Perkins Coie LLP (57) ABSTRACT

A partial HDMI physical layer ("phy") decoder core is used in an audiovisual (A/V) sink device to perform HDCP pre-authentication on inactive HDMI ports, so as to enable fast switching between HDMI ports. Whenever a source device is connected to the any HDMI port of the A/V sink device, HDCP authentication is performed on that port immediately, even if A/V data on that port is not being output to a user. As a result, when the user switches between HDMI channels, the output is available to the user instantly, without any HDCP-related delay. The A/V sink includes the partial HDMI phy decoder core in addition to a full HDMI phy decoder core. The full HDMI phy decoder core is used to extract and decode signals received on the active port. The partial HDMI phy decoder core is used to extract and decode only those HDMI signals received on an inactive port that are needed for pre-authenticating the inactive port.

25 Claims, 6 Drawing Sheets

FAST PORT SWITCHING IN AN AUDIOVISUAL RECEIVER BY USE OF PORT PRE-AUTHENTICATION BY A PARTIAL PHY DECODER CORE

This application claims the benefit of U.S. Provisional Patent Application No. 61/320,603, filed on Apr. 2, 2010, which is incorporated herein by reference in its entirety.

FIELD OF THE INVENTION

At least one embodiment of the present invention pertains to data communication in audiovisual devices, and more particularly, to fast port switching in an audiovisual receiver by use of port pre-authentication.

BACKGROUND

Many modern consumer electronic devices, such as televisions, set-top boxes, digital video recorders (DVRs), digital video disk (DVD) players, etc., support High-Definition Multimedia Interface (HDMI) for connecting with other devices. HDMI is an audio/video (A/V) interface used for transmitting uncompressed digital data. Many devices have multiple HDMI ports, allowing such devices to be connected to two or more other HDMI-compatible devices.

A device that transmits data to another device is referred to as a "source" or "source device", whereas a device which receives data from another device is referred to as a "sink" or "sink device". A device can be both a source and a sink. Some source devices that use HDMI may encrypt the data they transmit over an HDMI interface by using High-bandwidth Digital Content Protection (HDCP). HDCP is a protocol for preventing the copying of digital A/V content as it travels across a connection, such as an HDMI link or other type of audio/video link. A connected sink device in that case must also implement HDCP and must first be authenticated by the source, to be able to decode and play the received data stream.

The use of HDCP by a sink device with multiple HDMI ports can have undesirable side effects from the perspective of a user. Consider, for example, that a user may have multiple HDMI sources concurrently connected to a given sink device, where each source is connected to a different HDMI port on the sink device. This type of configuration allows the user to switch easily from one source to another, for example, to switch back and forth between a cable box and a DVD player as the A/V source for a television (the sink). In this scenario the port that is connected to the currently selected source at any given point in time is called the "active port".

Whenever an HDMI sink device that implements HDCP switches between HDMI ports (i.e., selects a different HDMI port as the active port), the sink and the source perform an HDCP authorization routine, which must be completed successfully before the sink can play (or otherwise decode and use) the received data. The authorization routine can take several seconds to complete. During the authorization routine the user often experiences a noticeable delay, such as a blank screen if the sink is a television. Such a delay can be annoying to the user.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, such references are not necessarily mutually exclusive either.

In accordance with the apparatus and technique introduced here, a partial HDMI physical layer ("phy") decoder core is used in an A/V sink device to perform HDCP pre-authentication on inactive HDMI ports, to enable fast switching between HDMI ports, as described further below. Note, however, that the apparatus and technique introduced here can also be used for fast port switching other applications, such as with other types of communication interfaces and/or protocols, and are not limited to use with HDMI or HDCP.

The apparatus and technique introduced here perform authentication on all external ports, even inactive ports, even before the user starts using the corresponding channels, as described further below. In other words, whenever a source device is connected to the any of the external ports of an A/V sink, that port performs authentication on that port immediately, even though the corresponding channel is not being viewed (or otherwise used) by the user. Hence, the link will almost always stay authenticated (subject to certain exceptions, explained below). As a result, when the user switches between channels (ports), the output will be available to the user instantly, without any authentication-related delay.

One way to implement fast HDMI port switching, which is not optimal, would be to replicate all of the HDMI circuitry for each HDMI port. However, that solution would increase the required chip area, gate count and power consumption in proportion to the number of ports. The technique introduced here provides fast HDMI port switching while avoiding these undesirable effects.

In a conventional HDMI compatible A/V device, the HDMI ports have several layers of associated circuitry, including circuitry that implements the physical layer of the HDMI links, sometimes called "the phy circuitry", or simply "the phy". The heart of the phy circuitry is a decoder core. The decoder core contains the logic responsible for decoding the HDMI data signals; specifically, it extracts and decodes the Transition Minimized Differential Signaling (TMDS) signals and the clock signal received on one or more HDMI ports.

However, not all of the signals conveyed on an HDMI link are needed for purposes of establishing and maintaining HDCP authentication. Therefore, according to the apparatus and technique introduced here, an HDMI-compatible A/V sink includes a partial HDMI physical layer ("phy") decoder core in addition to a full HDMI phy decoder core. The full HDMI phy decoder core is used to extract and decode signals received on the active port in a conventional manner. The partial HDMI phy decoder core is a reduced version of a full HDMI phy decoder core and is used to extract and decode only those HDMI signals received on the inactive ports that are needed for pre-authenticating the inactive ports (i.e., for performing HDCP authentication on those ports before they are selected as the active port). Those signals are the vertical synchronization (VSync) signal and the encryption enable (ENC_EN) signal. In one embodiment the partial HDMI decoder core is dedicated for the purpose of pre-authentication of inactive ports, i.e., it is not used for an active port. Furthermore, after authentication of an inactive port is initially established, authentication can be maintained for that port just by using the VSync signal, as described further below. Consequently, portions of the partial decoder core that are not needed for decoding VSync can be powered down after initial HDCP authentication is established (e.g., per the HDCP standard), to reduce power consumption.

Before further describing the apparatus and technique introduced here, it is useful to define certain terminology. Accordingly, as used herein:

The term "logic" means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, or other similar device(s); or c) a combination of the forms mentioned in a) and b).

The terms "full decoder core", "full core" and variations thereof mean the physical layer logic to extract and decode all available data signals on at least one physical link for a particular physical layer protocol. In the case of HDMI, therefore, a "full decoder core" contains logic to decode at least TMDS channels 0, 1 and 2 and the TMDS clock signal.

The terms "partial decoder core", "partial core" and variations thereof mean the physical layer logic to extract and decode only certain selected signals, i.e., less than all of the available data signals, on at least one physical link for the particular physical layer protocol.

For purposes of explanation, all references to "HDMI" or "the HDMI specification" in this detailed description should be understood to be referring to the "High-Definition Multimedia Interface Specification," version 1.4 a, HDMI Licensing, LLC, Mar. 4, 2010. All references to "HDCP" or "the HDCP specification" in this detailed description should be understood to be referring to "High-bandwidth Digital Content Protection System," revision 1.4, Digital Content Protection LLC, Jul. 8, 2009. Note, however, that these particular documents are referenced only for purposes of explanation, not limitation.

The partial HDMI decoder core according to one embodiment of the technique introduced here essentially includes only the circuitry needed to decode the VSync and ENC_EN signals for an inactive port, since those are the only signals needed to establish and maintain HDCP authentication of an HDMI port.

Figure 1:
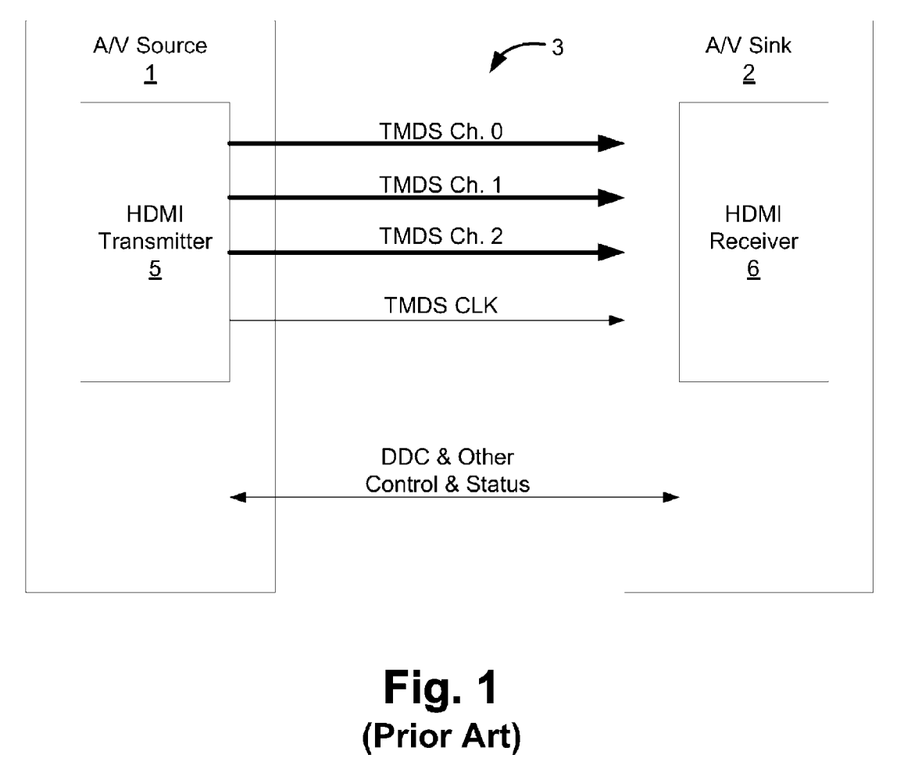
FIG. 1 illustrates an A/V transmitter and receiver implementing a conventional HDMI link.

Refer now to FIG. 1, which illustrates a conventional HDMI-compatible A/V source 1 and sink 2, coupled by a single HDMI link 3 (i.e., one HDMI port on each device). The source 1 includes an HDMI transmitter 5, and the sink includes an HDMI receiver 6. The HDMI link 3 includes a TMDS clock signal and three TMDS data signals, conventionally named TMDS channels 0, 1 and 2. Other control and status signals, including a Display Data Channel (DDC), may also be communicated between the source and sink.

Figure 2:
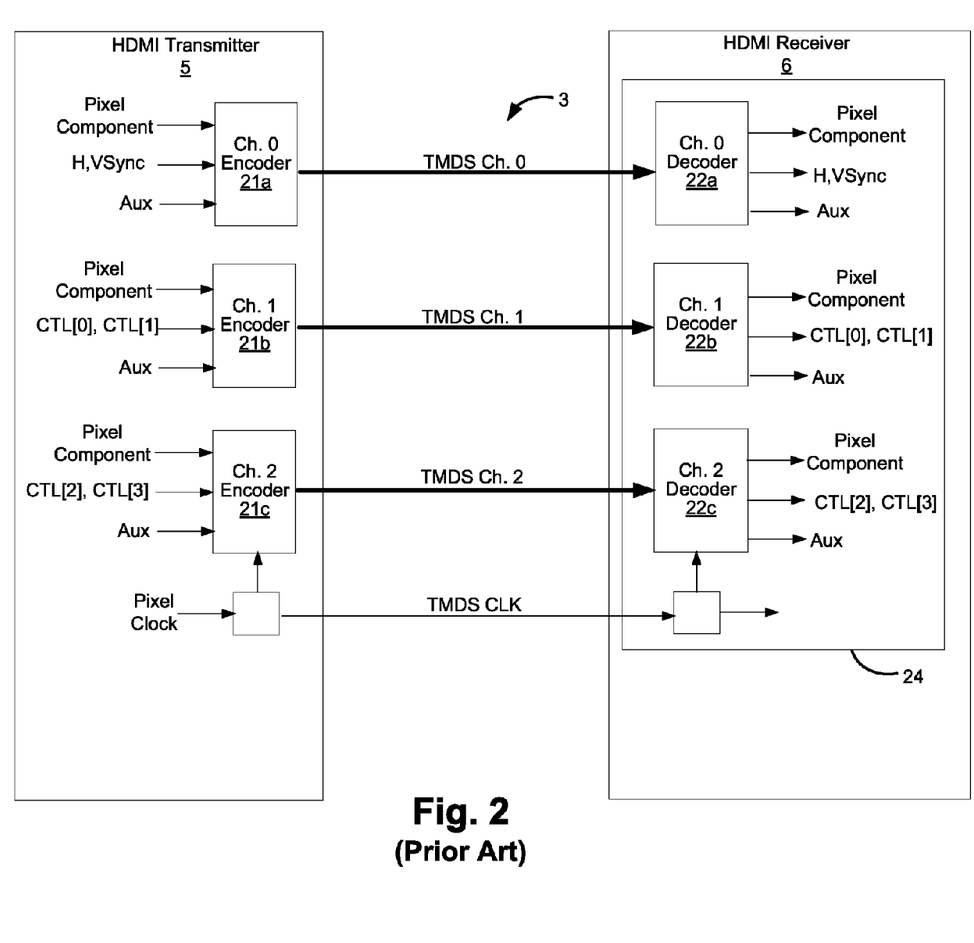
FIG. 2 illustrates the conventional HDMI link of FIG. 1 in greater detail.

FIG. 2 illustrates the conventional HDMI transmitter 5 and HDMI receiver 6 of FIG. 1 in greater detail. The HDMI transmitter 5 includes three TMDS encoders, 21a, 21b and 21c, for encoding TMDS channels 0, 1 and 2, respectively. Similarly, the HDMI receiver 6 includes three corresponding TMDS decoders 22a, 22b and 22c, for decoding TMDS channels 0, 1 and 2, respectively. The transmitter 5 and receiver 6 each also include a latch 23a or 23b, respectively, to receive and buffer the TMDS clock signal. The three decoders 22a, 22b and 22c and latch 23b make up a significant portion of a full HDMI decoder core 24 in the receiver 6.

The inputs to the channel 0 encoder 21a and the corresponding outputs of the channel 0 decoder 22a include an eight-bit pixel component (e.g., the blue component), the horizontal synchronization (HSync) and VSync signals (2 bits), and four bits of auxiliary data (e.g., a packet header). The inputs to the channel 1 encoder 21b and the corresponding outputs of the channel 1 decoder 22b include an eight-bit pixel component (e.g., the green component), the two least significant bits of the four-bit CTL signal (i.e., CTL[0] and CTL[1]), and four bits of auxiliary data (e.g., audio sample). The inputs to the channel 2 encoder 21c and the corresponding outputs of the channel 2 decoder 22c include an eight-bit pixel component (e.g., the red component), the two most significant bits of the four-bit CTL signal (i.e., CTL[2] and CTL[3]), and four bits of auxiliary data (e.g., audio sample). Each TMDS channel carries a 10-bit character between the encoder 21 and corresponding decoder 22.

The technique and apparatus introduced here provide fast switching on all HDMI ports with very little increase in chip area and power consumption. To accomplish this, in one embodiment only digital logic blocks needed for HDCP authentication are duplicated per port; the rest of the HDMI digital logic, such as the logic that deals with format detection, deep color, island unpacking, etc., is shared between multiple ports.

Figure 3:
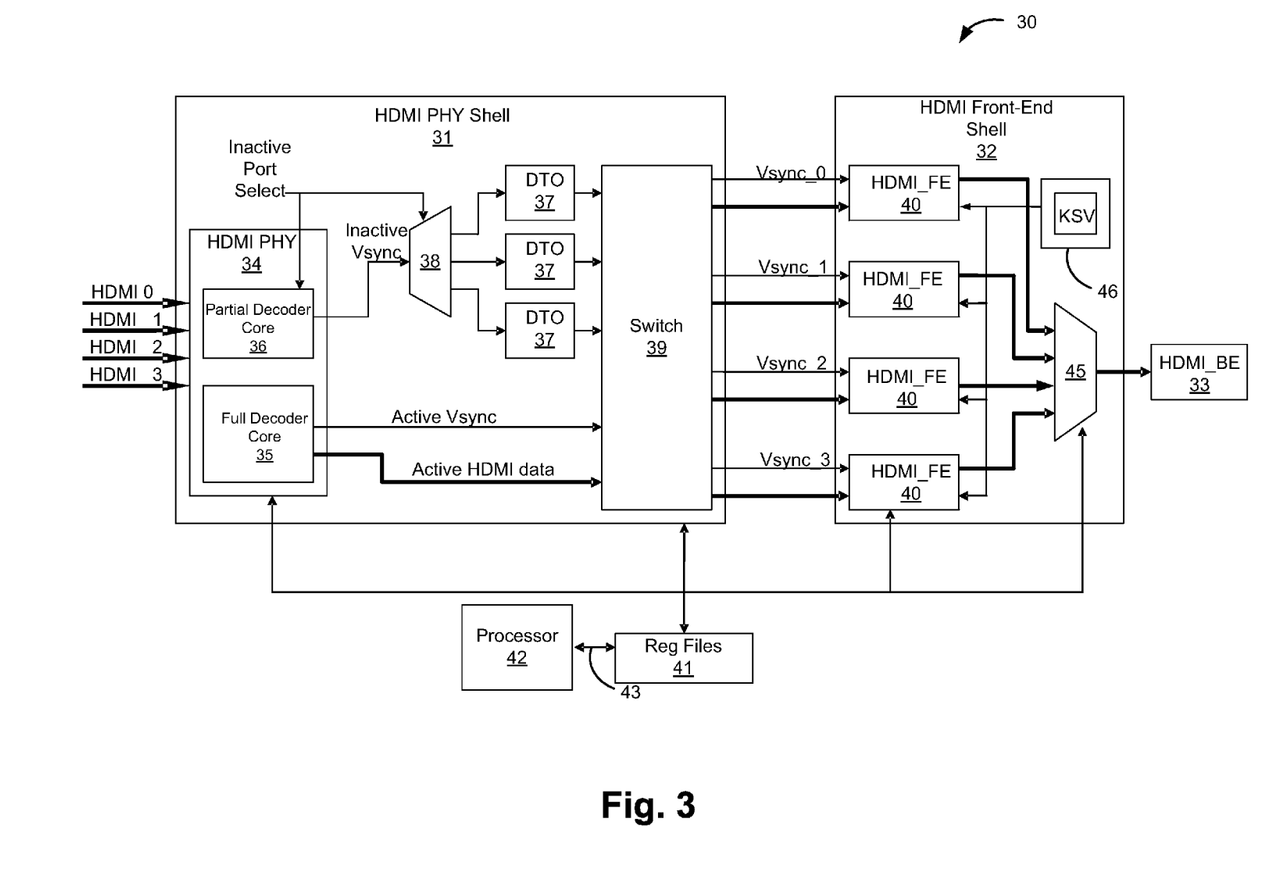
FIG. 3 illustrates certain components of an HDMI receiver in accordance with an embodiment of the technique introduced here.

FIG. 3 illustrates relevant components of an HDMI receiver in accordance with an embodiment of the technique introduced here. In the illustrated embodiment the receiver 30 includes an HDMI phy shell 31, an HDMI front-end shell 32 and HDMI back-end logic 33. In the illustrated embodiment, the receiver 30 has four HDMI ports: HDMI_0, HDMI_1, HDMI_2 and HDMI_3.

The HDMI phy shell 31 includes the receiver's HDMI phy circuitry 34 and is primarily responsible for extracting and decoding physical layer signals received on various HDMI ports. In one embodiment, as shown in FIG. 3, the HDMI receiver logic outside of the HDMI phy shell 31 is separated into two distinct sections, namely, the HDMI front-end shell 32 and the HDMI backend logic 33. The HDMI front-end shell 32 is primarily responsible for performing HDCP authentication. The HDMI backend logic 33 is primarily responsible for data island unpacking, pixel unpacking and format detection. The HDMI front-end shell 32 contains circuitry that is duplicated for each HDMI port (HDMI front-end circuits), whereas the HDMI backend logic 33 is shared by all of the HDMI ports.

The HDMI phy circuitry 34 includes a full HDMI phy decoder core 35 and a partial HDMI phy decoder core 36. The full decoder core 35 contains decoders for each of the TMDS channels 0-3 and is used to extract and decode signals received on the active HDMI port, in a conventional manner. The partial decoder core 36 is used to extract and decode signals for TMDS channels 0 and 2 only (in one embodiment) that are received on the inactive HDMI ports, only for purposes of authentication. More specifically, the partial decoder core 36 extracts and decodes the VSync and encryption enable/disable (ENC_EN/DIS) signals for the inactive ports. The partial decoder core 36 is described further below.

In addition to containing the HDMI phy circuitry 34, the HDMI phy shell 31 includes three discrete time oscillators (DTOs) 37 (one for each inactive port), a 1-to-3 demultiplexer 38 and a full-crossbar switch 39. The input of each DTO 37 is coupled to receive from the partial decoder core 36, via multiplexer 38, the decoded channel 0 output of one of the three inactive ports (assuming one HDMI port is active). The DTOs 37 each output a pseudo-Vsync signal for a corresponding inactive port. Each DTO 37 is essentially a filter that locks onto the VSync signal at its input and generates a copy of that VSync signal in the form of a pseudo-Vsync signal.

Before further considering the receiver, it is useful to note certain features of the HDCP protocol. HDCP-based authentication can be divided into three phases, or "parts" as stated in the HDCP specification: The first part involves initially establishing authentication for a port. In general terms, the source device initiates authentication by sending its Key Selection vector (KSV), designated Aksv, to the sink device. The sink device responds with its KSV, called Bksv, which the source verifies. In generally, the sink device computes a series of values, called $R_i'$ (i=0, 1, 2, . . . ), which are sent to the source device where they are compared to the source's own corresponding $R_i$ values. Only if the corresponding $R_i/R_i'$ values match can the sink be considered to be authenticated. The initial $R_i'$ value sent by the sink device to the source device during the first part of the authentication is called $R_0'$.

The second part of the authentication is done only for sinks that are repeaters and is not germane to this description. The third part of the authentication is the process of ongoing authentication, i.e., maintaining authentication on a port once it has been initially authenticated. This part involves the sink device repeatedly recalculating its $R_i'$ and sending it to the source device for comparison against the source device's corresponding $R_i$.

With the above in mind, refer again to FIG. 3: The pseudo-Vsync signal output by each DTO 37 keeps an HDCP state machine in a corresponding HDMI front-end circuit (described below) running, for purposes of calculating $R_i'$, to maintain authentication after authentication has been established. Once a DTO 37 locks onto its input VSync signal and begins outputting a corresponding pseudo-VSync signal, that DTO can continue outputting its pseudo-VSync signal even after its VSync input is switched off by demultiplexer 38.

The full-crossbar switch 39 receives the pseudo-VSync signal from each DTO 3. Additionally, the full-crossbar switch 39 receives the decoded VSync signal and HDMI data of the active port from the full decoder core 35. The full-crossbar switch 39 routes these inputs to appropriate ones of four HDMI front-end circuits 40 in the HDMI front-end shell 32. In particular, full-crossbar switch 39 provides the VSync of each HDMI port to a different HDMI front-end circuit 40. A separate HDMI front-end circuit 40 is provided for each HDMI port of the receiver 30.

Switching/selection of the demultiplexer 38 and full-crossbar switch 39 is controlled by the contents of one or more register files 41, which are programmed by a processor 42 that controls the overall operation of the receiver 30. The processor 42 can be or include, for example, one or more general-purpose or special-purpose programmable microprocessors, ASICs, PLDs, FPGAs, or the like. In one embodiment, the register files 41 are accessed by the processor 42 via a bus 43, which in one embodiment is a Peripheral Virtual Component Interface (PVCI) bus.

The HDMI front-end 32 shell includes the four HDMI front-end circuits 40 (one for each HDMI port) as well as a 4-to-1 multiplexer 45 and a memory 46 for storing HDCP key values, e.g., a key selection vector (KSV). In one embodiment the memory 46 is a static random access memory (SRAM). The four HDMI front-end circuits 40 each include a separate HDCP engine and are responsible for performing standard HDCP authentication operations, such as in accordance with the HDCP specification. These operations make use of the KSV (more particularly, the Bksv per the HDCP specification) stored in the memory 46.

Each HDMI front-end circuit 40 contains logic for performing HDCP authentication (e.g., decrypting and key descrambling), an I2C slave (each HDMI front end circuit 40 has a direct connection, not shown, to the corresponding HDMI port's I2C pins), and its own register file. Each HDMI front-end circuit 40 calculates and updates $R_i$ values regardless of whether the associated port is in the active or inactive mode. While the associated port is in the active mode, the HDMI front-end circuit 40 outputs decrypted valid data to the HDMI backend logic 33, via multiplexer 45. Each HDMI front-end circuit 40 has its own interrupt registers and reset domain.

Outputs of the HDMI front-end circuits 40 are multiplexed by multiplexer 45, under control of an active port select signal from the main register files 41, and sent to the HDMI backend logic 33. In one embodiment, communication between HDMI front-end circuits 40 and the HDMI backend logic 33 is unidirectional, i.e., from front-end to backend. This approach makes the design compatible with future changes, such as power domain or slice changes.

The HDMI backend logic 33 receives decrypted data of the active port from the HDMI front-end shell 31. It contains logic for data island unpacking, pixel unpacking and format detection. It also contains a separate register file from that of the HDMI front-end circuits 40.

As mentioned above, each HDMI port in the illustrated embodiment has its own HDCP-related logic, namely, the HDMI front-end circuits 40. This approach reliably supports simple $R_i$ authentication for inactive ports. In one embodiment the A/V source device checks $R_i$ at least once every two seconds. The $R_i$ value is updated once every 128 encrypted (ENC_EN-signaled) frames (when advanced ciphering is disabled), except during assertion of the AVMUTE signal (defined by the HDMI specification). AVMUTE is indicated in the HDMI General Control Packet. ENC_EN/DIS is indicated by the most significant bit of the CTL[3:0] signal, i.e., by CTL[3].

In a conventional HDMI decoder, decoding AVMUTE and CTL[3:0] would require that all TMDS channels be decoded at all ports. But doing so could boost power consumption by the HDMI phy circuitry beyond desired levels if this were done for inactive ports for purposes of authentication. Therefore, certain assumptions and simplifications can be made to reduce power consumption.

First, the first ENC_EN signal should be detected properly, since it indicates the beginning of the final phase of HDCP authentication (the "third part" of authentication as defined by the HDCP specification), triggering frame counting for R. However, ENC_EN can be detected by using only CTL[3], which is carried on TMDS channel 2. Second, once the sink device receives the first encryption-enabled frame, the sink device can assume that all subsequent frames are also encrypted. Thus, the frame counter for an inactive port can be incremented at every VSync, regardless of the state of ENC_EN/DIS or AVMUTE. Consequently, for ongoing authentication after authentication has been initially established, only VSync (carried on TMDS channel 0) is used for inactive ports. This means that circuitry which is not needed for decoding VSync can be powered down to reduce power consumption.

When a sink sends AVMUTE or ENC_DIS (encryption disable), the HDCP front-end circuit 40 for a pre-authenticated inactive port will continue to update its $R_i$, eventually causing authentication to fail. In that event, reauthentication will be performed on that inactive port, after powering up any partial decoder core circuitry that was powered down.

Referring again to the HDMI phy shell, power consumption of a full HDMI phy decoder core can be relatively large. Therefore, it is not desirable to replicate a full HDMI phy decoder core for all ports and keep them running at the same time. Hence, the HDMY phy circuitry 34 in the receiver 30, according to one embodiment, has one full HDMI decoder core 35 for the active port and one configurable, partial HDMI decoder core 36 for the inactive ports. The full HDMI decoder core 35 contains circuitry to decode all TMDS channels, whereas the partial decoder core 36, according to one embodiment, contains circuitry only for decoding TMDS channels 0 and 2, which are the only TMDS channels needed for HDCP authentication. In one embodiment the partial decoder core 36 is shared among the inactive ports by time division multiplexing.

In the HDMI protocol, VSync is encoded in TMDS channel 0 and ENC_EN/DIS is encoded in TMDS channel 2 (as CTL[3]). It is important to detect the first ENC_EN signal assertion for a port, for reliable authentication. Therefore, in operation, TMDS channels 0 and 2 are decoded for an inactive port (by the partial decoder core 36) at least until the first ENC_EN assertion is received. After that, in one embodiment the partial decoder core 36 will be configured to decode only TMDS channel 0 to obtain VSync. Any circuitry in the partial decoder core 36 not needed for obtaining VSync, such as the channel 2 TMDS decoder, can be powered down at that stage to save power, as noted above. The powered down circuitry can be subsequently powered up again if and when authentication is lost for an inactive port (e.g. due to assertion of AVMUTE or ENC_DIS) such that reauthentication of that port becomes necessary.

Additionally, to reduce power consumption further, pre-authentication of inactive ports can be configured to be done only when the sink device is powered on, such that no authentication is done on any port when in stand-by mode. To further optimize, in one embodiment HDMI ports do not support Enhanced Link Verification Response (i.e., use of the $P_j$ value as defined by the HDCP specification, which requires the first 8 bits of video data), but will instead authenticate with the $R_i$ value only (calculated once per 128 frames).

In one embodiment the partial decoder core 36 can decode only one HDMI port at a time, and its operation is time division multiplexed between the inactive ports. The decoded VSync from the currently selected inactive port is demultiplexed to an appropriate one of the DTOs 37, according to which port is currently being authenticated. The appropriate DTO 37 extracts the timing and generates a pseudo-VSync signal for that inactive port. After initial authentication has been established (e.g., the "first part" of HDCP authentication as defined in the HDCP specification), the pseudo-Vsync signal keeps an HDCP state machine running in the corresponding HDMI front-end circuitry 40 for purposes of performing $R_i$ calculations for ongoing authentication.

When the initial authentication process for an inactive port has been completed (i.e., has reached a state in which the source has verified the $R_0$ value from the sink and only VSync is needed to maintain authentication of that port), the partial decoder core 36 will be switched to select the next inactive port, to begin the initial phase of authentication on the next inactive port; however, the DTO 37 that corresponds to the previously selected inactive port will keep generating the pseudo-VSync signal for that port to maintain authentication (update $R_i$) of that port. Consequently, R can still be updated every 128 frames, even though the corresponding inactive port is not being decoded.

Figure 4:
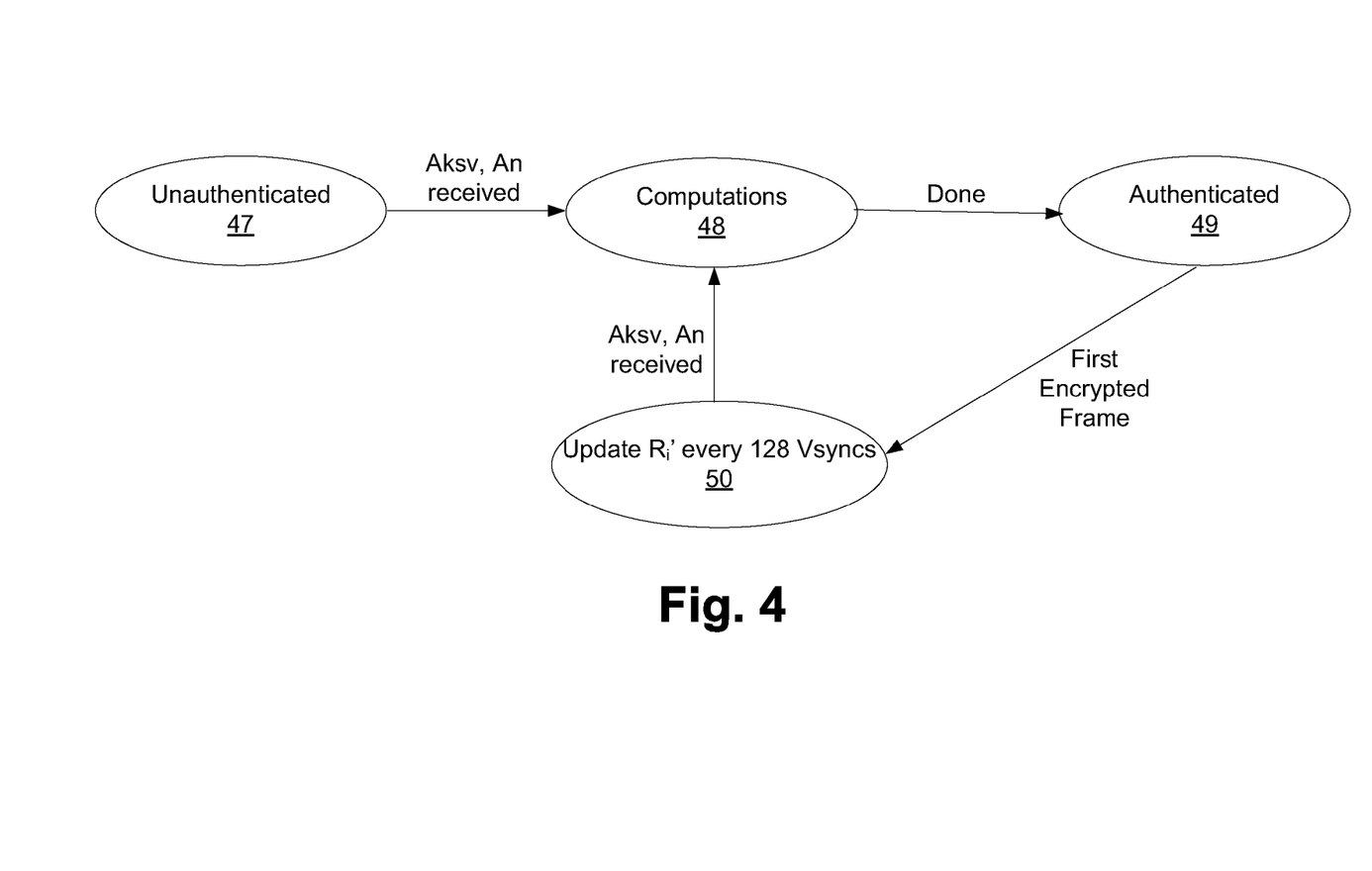
FIG. 4 is a state diagram illustrating operation of the HDCP front-end logic.

FIG. 4 illustrates the operation of the state machine implemented in each HDMI front-end circuit 40 for its respective port, according to one embodiment. When in the unauthenticated state 47, receipt by the sink device of the Aksv and An values (as defined by the HDCP specification) from the source device causes transition to computation state 48, in which R computations are performed in the sink. When the $R_i$ computations are completed successfully, the sink transitions to the authenticated state ($R_0$ ready) 49. Once in the authenticated state 49, receipt of the first encrypted frame on the corresponding port triggers transition to the ongoing authentication state 50, in which $R_i'$ is updated every 128 VSyncs. Receipt of additional Aksv and An values while in the ongoing authentication state 50 will cause transition back to the computation state 48 so that updated computations of $R_i$ can be performed.

Figure 5:
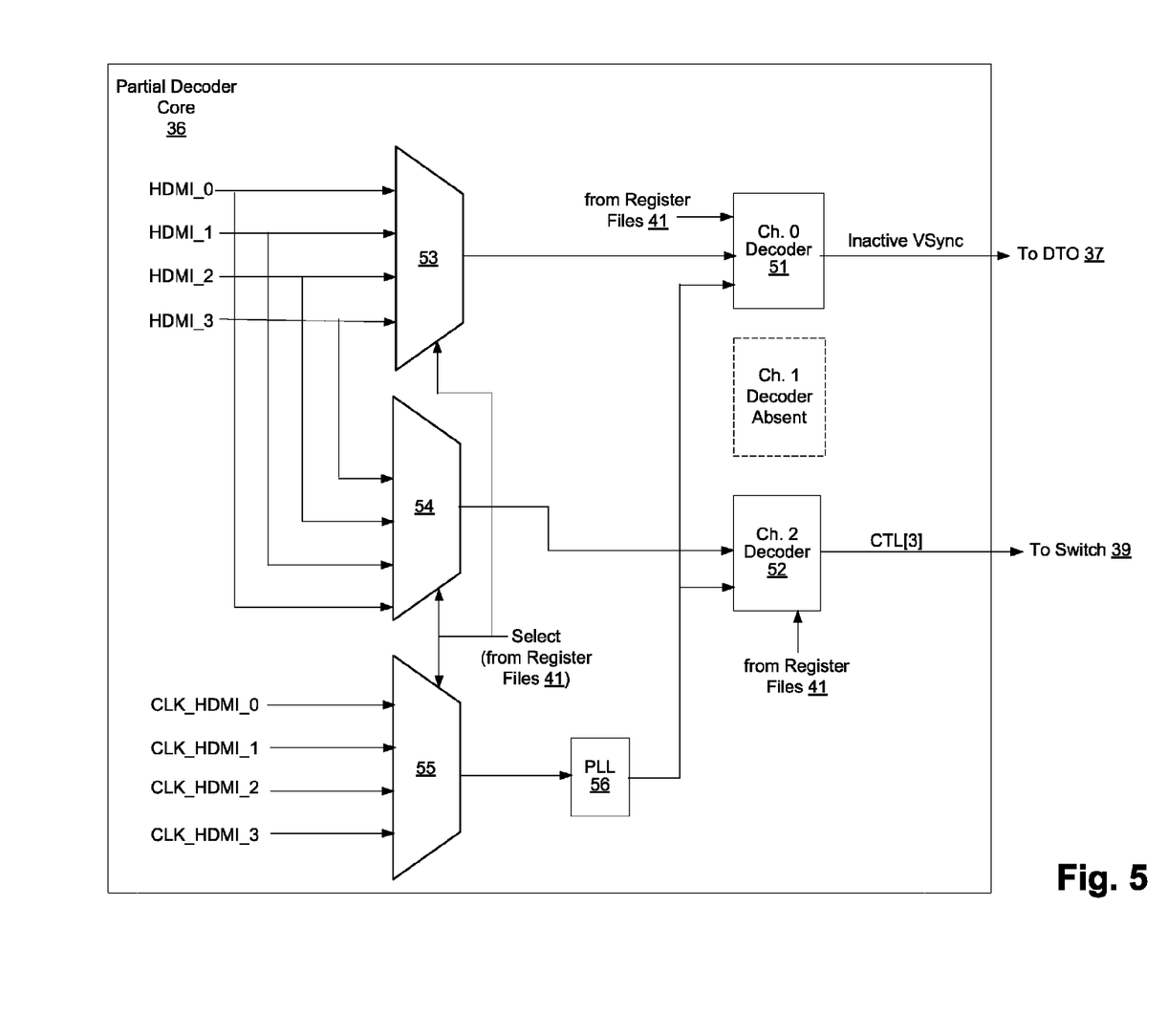
FIG. 5 illustrates relevant details of the HDMI phy partial decoder core.

FIG. 5 illustrates the relevant elements of the HDMI phy partial decoder core 36, according to one embodiment. The partial decoder core 36 in the illustrated embodiment includes two TMDS decoders 51 and 52, for decoding TMDS channels 0 and 2, respectively. In the illustrated embodiment the partial decoder core 36 does not include a third TMDS decoder for TMDS channel 1; the absence of such third decoder is denoted by the dashed-line box. Note, however, that in an alternative embodiment, the partial decoder core 36 could be replaced by a second, full decoder core, i.e., one that includes a third TMDS decoder core for TMDS channel 1. Such an embodiment might be desirable, for example, to allow decoding of two active ports concurrently, in addition to pre-authentication of inactive ports. In such an embodiment, the TMDS channel 1 decoder could be kept powered down when not needed for decoding an active port. While such an embodiment would not save chip area to the extent that the above-described partial-core embodiment does, it nonetheless provides for little or no HDCP-related delay when switching ports and allows for reduced power consumption associated with the channel 1 encoder.

Additionally, the partial decoder core 36 includes a pair of multiplexers 53 and 54. The channel 0 decoder 51 receives the output of the first multiplexer 53, and the channel 2 decoder 52 receives the output of the second multiplexer 54. The first and second multiplexers 53, 54 each receive the four "raw" HDMI port input signals, HDMI_0, HDMI_1, HDMI_2 and HDMI_3. Selection control signals for multiplexers 53 and 54 are provided by the register files 41 (FIG. 3).

The output of the channel 0 decoder 51 includes the VSync signal for the currently-selected inactive port. This signal is provided to the DTO 37 corresponding to the selected port via multiplexer 38 (FIG. 3). The output of the channel 2 decoder 52 includes CTL[3], which represents the ENC_EN/DIS signal and which is provided to the full-crossbar switch 39.

In one embodiment, the HDMI input 5V connector pins on the sink device are directly connected to processor-accessible registers in the HDMI receiver; consequently, the processor 42 knows at all times which ports are connected. The processor 42 uses the state of the connections to determine which inactive port(s) should be pre-authenticated, i.e., to determine the appropriate selection signal states for multiplexers 53 and 54; only an inactive port to which a source device is connected are pre-authenticated.

The partial decoder core 36 also includes a third multiplexer 55 that receives the TMDS clock signal of each of the HDMI ports and outputs the currently-selected one of them to a phase lock loop (PLL) 56. The PLL 56 provides its corresponding output clock signal to each of the TMDS channel decoders 51 and 52.

The full decoder core 35 can be assumed to include elements substantially the same as those shown in FIG. 5, but further including a third decoder and a corresponding additional multiplexer, to allow decoding of TMDS channel 1.

Figure 6:
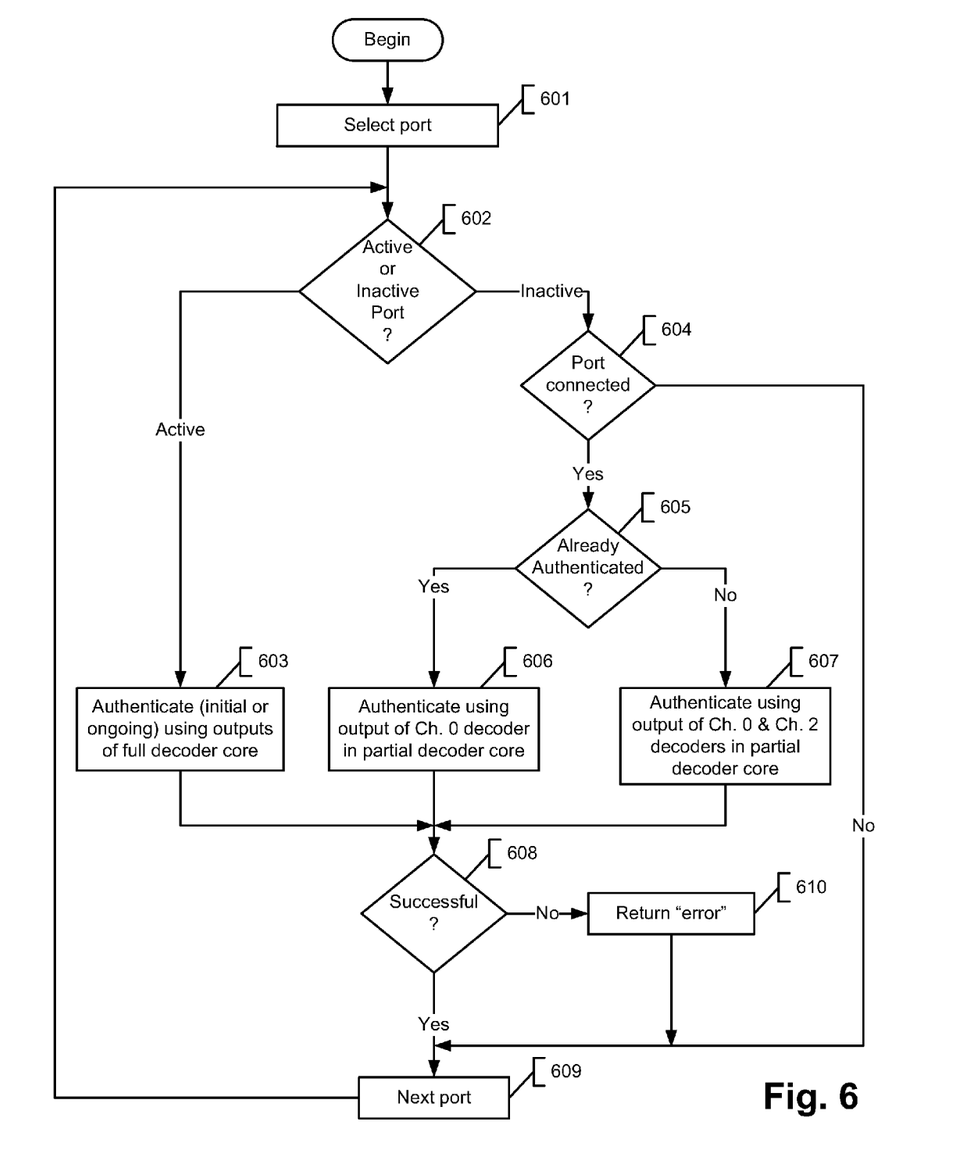
FIG. 6 is a flow diagram showing an example of an overall authentication process implemented by an A/V sink device in accordance with the technique introduced here.

FIG. 6 shows, at a conceptual level, an example of the overall process carried out by the authentication logic in an A/V sink device in accordance with one embodiment of the technique introduced here. Initially, at step 601 the process selects an HDMI port of the sink device. At step 602 the process determines whether the selected port is an active port or an inactive port. Steps 602 through 607 collectively show the different processing of the active port and inactive ports for HDCP authentication purposes. In particular, step 603 illustrates normal HDCP authentication of the active HDMI port, while steps 604 through 607 illustrate HDCP pre-authentication of inactive HDMI ports. Note that normal authentication of the active port and pre-authentication of inactive ports can occur concurrently.

If the selected port is an active port, then the process proceeds to step 603 to authenticate that port by using the decoder outputs from the full decoder core 35, and then proceeds to step 608. Step 603 may involve initial authentication if the active port has not already been authenticated or ongoing authentication if the active port has already been authenticated.

Note that if a port becomes an active port after having been an inactive port and pre-authenticated, ongoing authentication will be handled by the HDMI front-end circuit 40 for that port based on the outputs of the full decoder core 35, rather than the partial decoder core 36, from the point in time that the port becomes active.

On the other hand, if at step 602 the selected port is determined to be an inactive port, then the process instead proceeds from step 602 to step 604, in which the process determines whether a source device is connected to the selected port. If no source device is connected to the selected port, then the process proceeds to step 609, in which the next port is selected (e.g., according to the alphanumeric sequence of the ports' identifiers), and the process then loops back to step 602.

In the illustrated embodiment, if a source device is determined to be connected to the selected port at step 604, then the process proceeds to step 605, in which the process determines whether that inactive port has already been authenticated. If the port has not already been authenticated, then the process proceeds to step 606 in which initial authentication of that inactive port is done by using the channel 0 and channel 2 decoder outputs from the partial decoder core 36 (i.e., VSync and ENC_EN), as described above. If the selected inactive port has already been authenticated, however, then in the illustrated embodiment the process bypasses step 606 and only needs to perform ongoing authentication on that port at step 607, by using only the channel 0 decoder output from the partial decoder core 36.

Note that if a port becomes inactive after having been the active port and authenticated, it is treated as having already been authenticated for purposes of step 605. In that case, however, ongoing authentication will be handled by the HDMI front-end circuit 40 for that port based on the outputs of the partial decoder core 36, rather than the full decoder core 35, from the point in time that the port becomes inactive.

After step 603, 606 or 607, if the authentication or pre-authentication (whichever applies) was successful (step 608), then the process proceeds to step 609 to select the next port, and the process then loops back to step 602. Otherwise, the process first returns an error message to the calling entity at step 610, before selecting the next port at step 609 and then looping back to step 602.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    decoding a first set of HDMI signals received on an active port of a plurality of HDMI ports of an HDMI sink, by using a full HDMI decoder core in the HDMI sink; and
    performing authentication on an inactive port of the plurality of HDMI ports, by using a partial HDMI decoder core, separate from the full HDMI decoder core, to decode a second set of HDMI signals received on the inactive port, wherein the partial HDMI decoder core includes no more than two TMDS decoders, and wherein said no more than two TMDS decoders are used to decode a synchronization signal and an encryption enable signal.

2. A method as recited in claim 1, wherein the partial HDMI decoder core is dedicated for use only in authentication.

3. A method as recited in claim 2, further comprising:
    performing authentication on the active port by using the full HDMI decoder core to decode signals for authentication.

4. A method as recited in claim 1, wherein performing authentication on the inactive port comprises performing HDCP authentication.

5. A method as recited in claim 1, wherein performing authentication on the inactive port comprises:
    using a first decoder in the partial HDMI decoder core to decode a vertical synchronization signal in the second set of HDMI signals; and
    using only a second decoder in the partial HDMI decoder core to decode an encryption enable signal in the second set of HDMI signals.

6. A method as recited in claim 5, wherein the inactive port is a first inactive port, the method further comprising:
    after completion of an initial phase of authentication on the first inactive port, beginning an initial phase of authentication on a second inactive port of the plurality of HDMI ports while using the vertical synchronization signal from the first inactive port to update calculations as part of continuing authentication on the first inactive port.

7. A method as recited in claim 6, further comprising:
    powering down the second decoder after the initial phase of authenticating the first inactive port is complete.

8. A method as recited in claim 7, further comprising:
after powering down the second decoder, powering up the second decoder to perform reauthentication of the first inactive port, in response to a prior authentication of the first inactive port being lost.

9. A method as recited in claim 1, further comprising:
sequentially checking each inactive port of the plurality of HDMI ports to determine whether said inactive port has an external device connected thereto; and
for only those inactive port or ports determined to have an external device connected thereto, performing authentication by using the partial HDMI decoder core.

10. A method of performing HDCP authentication in an HDMI sink that has a plurality of HDMI ports, at least one of which is an inactive port, the method comprising:
using a full HDMI physical layer decoder core to decode a first set of HDMI signals received on an active port of the plurality of HDMI ports;
sequentially checking each inactive port of the plurality of HDMI ports to determine whether each said inactive port has an external device connected thereto; and
for only those inactive port or ports determined to have an external device connected thereto, performing HDCP authentication on said inactive port by using a partial HDMI physical layer decoder core to decode a second set of HDMI signals for use in HDCP authentication, including for each of the inactive ports,
using a first decoder in the partial HDMI decoder core to decode a vertical synchronization signal in the second set of HDMI signals; and
using only a second decoder in the partial HDMI decoder core to decode an encryption enable signal in the second set of HDMI signals, wherein the first decoder and the second decoder are the only operational decoders in the partial HDMI decoder core during HDCP authentication of inactive ports.

11. A method as recited in claim 10, wherein the inactive port is a first inactive port, the method further comprising:
after completion of an initial phase of HDCP authentication on the first inactive port, beginning an initial phase of authentication on a second inactive port of the plurality of HDMI ports while using the vertical synchronization signal from the first inactive port to update calculations as part of continuing authentication on the first inactive port.

12. A method as recited in claim 11, further comprising:
powering down the second decoder after an initial phase of authenticating the first inactive port is complete.

13. A method as recited in claim 12, further comprising:
after powering down the second decoder, powering up the second decoder to perform reauthentication of the first inactive port, in response to a prior authentication of the first inactive port being lost.

14. A method as recited in claim 10, wherein the partial HDMI physical layer decoder core is dedicated for use only in authentication.

15. A method as recited in claim 14, further comprising:
performing HDCP authentication on the active port by using the full HDMI physical layer decoder core to decode HDMI signals for use in HDCP authentication.

16. An HDMI link interface for use in an HDMI sink, the HDMI link interface comprising:
a first physical layer decoder core configured to decode N data channels of a first HDMI link associated with an active port of a plurality of HDMI ports of the HDMI sink, wherein N is a number greater than one, and wherein the first physical layer decoder core includes N TMDS decoders; and
a second physical layer decoder core configured to decode no more than M data channels of a second HDMI link associated with an inactive port of the plurality of HDMI ports, wherein M is a number less than N, and wherein the second physical layer decoder core includes no more than M TMDS decoders.

17. An HDMI link interface as recited in claim 16, further comprising:
authentication circuitry configured to perform authentication on a first port of the plurality of HDMI ports, based on at least some of the N data channels of the first HDMI link if the first port is the active port or based on the M data channels of the second HDMI link if the first port is an inactive port.

18. An HDMI link interface as recited in claim 17, wherein the authentication circuitry comprises a separate authentication circuit for each port of the plurality of HDMI ports.

19. An HDMI link interface as recited in claim 16, further comprising a discrete time oscillator to input a synchronization signal in one of the M data channels and to output a copy of the synchronization signal, wherein said copy of the synchronization signal is provided to the authentication circuitry for use by the authentication circuitry in performing authentication on the inactive port.

20. An HDMI link interface as recited in claim 16, wherein the data channels are TMDS channels, and wherein N equals three.

21. An HDMI link interface as recited in claim 20, further comprising:
circuitry to selectively power off one of the M TMDS decoders in the second physical layer decoder core after completion of an initial authentication phase.

22. An HDMI sink comprising:
a plurality of HDMI ports;
a first physical layer decoder core to decode TMDS data channels of a first HDMI link associated with an active port of the plurality of HDMI ports to extract media data from the TMDS data channels, the first physical layer decoder core including at least three TMDS channel decoders;
a second physical layer decoder core to decode TMDS data channels of a second HDMI link associated with an inactive port of the plurality of HDMI ports for use in performing HDCP authentication of the inactive port, the second physical layer decoder core including no more than two TMDS channel decoders;
a multiplexer coupled between the plurality of HDMI ports and the second physical layer decoder core;
authentication circuitry to perform HDCP authentication on each port of the plurality of HDMI ports; and
a plurality of discrete time oscillators coupled to the second physical layer decoder core through a multiplexer, each discrete time oscillator coupled to input a synchronization signal in one of the TMDS data channels associated with an inactive port and to output a copy of the synchronization signal, wherein the copy of the synchronization signal from each discrete time oscillator is provided to the authentication circuitry for use in performing HDCP authentication on inactive ports.

23. An HDMI sink as recited in claim 22, further comprising:
a full-crossbar switch coupled between the plurality of discrete time oscillators and the authentication circuitry.

24. An HDMI sink as recited in claim 23, wherein the authentication circuitry comprises a separate authentication circuit for each port of the plurality of HDMI ports.

25. An HDMI sink as recited in claim 22, further comprising:
  circuitry to selectively power off one of the TMDS decoders in the second physical layer decoder core after completion of an initial authentication phase.

* * * * *